United States Patent Office 3,287,412
Patented Nov. 22, 1966

3,287,412
$\Delta^{1,2}$-B-NORTESTOSTERONES
Louis R. Fare, Willingboro, and Kenneth G. Holden, Stratford, N.J., and Joseph R. Valenta, Philadelphia, Pa., assignors to Smith Kline & French Laboratories, Philadelphia, Pa., a corporation of Pennsylvania
No Drawing. Filed Mar. 10, 1964, Ser. No. 350,641
2 Claims. (Cl. 260—586)

This invention concerns B-nortestosterones having a double bond at the 1,2-position and methods for preparing these compounds. The compounds of this invention have utility as intermediates and as having sedative and antiandrogenic activity.

These compounds are illustrated by the following formula:

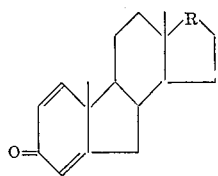

Formula I in which R is

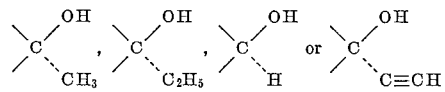

The compounds of Formula I are prepared by biotransformation using species of the genus Septomyxa such as *Septomyxa aesculi, Septomyxa corni* and especially *Septomyxa affinis*. It has been reported previously in the literature (Joska, Coll. Czech., Chem. Com. 26, 2068 (1961)) and in our copending applications that microbiological transformations in B-norsteroids either differ completely from the normal steroid series or tend to "shotgun" centers of activity. We have discovered surprisingly that fermentation with the genus Septomyxa (U.S. Patent No. 2,902,410) gives $\Delta^{1,2}$-congeners of certain B-norsteroids in very high yields in a specific manner.

The general conditions of the fermentation of this invention are as follows. The fermentation inocula are grown in 100 ml. of medium in 500 ml. Erlenmeyer flasks on a rotary shaker at 200 r.p.m. and ambient temperature, 200 ml. of inoculum is used per liters of fermentation medium.

The media used are liquid media providing assimilable sources of nitrogen and/or carbon. Additives variously used are corn steep liquor, peanut meal, fish meal, distillers dried solubles, coconut oil meal, Edamine trypticase, soy broth, dextrose etc. The fermentations are carried out in stir jars of New Brunswick Fermentation Units with a constant water bath temperature of 28–30° C. under aeration and agitation usually in the presence of an antifoam agent.

The substrate is dissolved in an organic solvent not detrimental to the fermentation such as ethanol and added beneath the surface of the medium usually after 24–48 hours growth of the selected organisms. The production of the product is monitored to judge subsequent additions of substrate. The progress of the biotransformation of the steroid substrate during the fermentation is followed by thin layer chromatography on aliquots removed aseptically from the fermentation mixture. The aliquots are extracted with methyl isobutyl ketone or another water immiscible organic solvent. 5λ of the solvent extract is applied to silica gel-G plates. After development by a suitable solvent, the plates are dried and sprayed with a 40% sulfuric acid solution followed by heating with a hot air gun (min. temp. 500° C.). The developed spots are visible under white light or by fluorescence under ultraviolet light.

Following the fermentation the products are isolated by broth clarification by centrifuge or filtration followed by extraction of the solids then extraction of the combined solid extract and broth with a suitable water immiscible organic solvent such as methylene chloride. The extracted material is then purified by recrystallization or chromatography such as over an alumina or silica gel column.

The following example will illustrate this invention. Normal modifications on the B-nortestosterone ring system except at 1,2 have not been found to vary the course of this invention.

Example 1

A fermentation medium composed of 10 liters of corn steep liquor adjusted to pH 6.3–6.5 with sodium hydroxide solution is autoclaved for 2 hours at 15 p.s.i. at 121° C. The medium is inoculated with a standard preparation of *Septomyxa affinis* NRRL 2746. Fermentation growth is carried out for 48 hours with aeration at 3 liters of air per minute per 10 liters and impeller speed of 200 r.p.m.

Five grams of B-nor - 17α - methyltestosterone (U.S. Patent 3,072,681) is dissolved in 50 ml. of 95% ethanol and added beneath the surface of the medium; 1 g. after 48 hours, 2 g. after 55 hours, 1 g. after 72 hours and 1 g. after 78 hours.

After the transformation is complete the mixture is centrifuged. The recovered solids are extracted with ethanol and then ethanol-methylene chloride. The extracts are filtered and added to the clarified broth which is exhaustively extracted with methylene chloride. After drying, the extracts are evaporated in vacuo at 50° C.

The residue is taken into petroleum etherbenzene and chromatographed over alumina (Woelm, IIII). The fractions eluted with benzene-petroleum ether (1:1) through benzene-methylene chloride (1:1) are combined and evaporated. The solid residue is recrystallized from acetone-hexane to give $\Delta^{1,2}$-B-nor-17α-methyltestosterone (48%), M.P. 140–141° C. after sublimation.

Substituting as substrates in this reaction, B-nortestosterone, B-nor-17α-ethyltestosterone and B - nor - 17α-ethynyltestosterone [U.S. Patent 3,072,681; Bull. Soc. Chem. France, 1581 (1958)] gives the respective $\Delta^{1,2}$ congeners.

O-acyl derivatives of these compounds having acyl groups derived from organic carboxylic or sulfonic acids having a maximum of 8 carbon atoms are prepared using an excess of the acid chloride in pyridine overnight.

What is claimed is:
1. A compound of the formula:

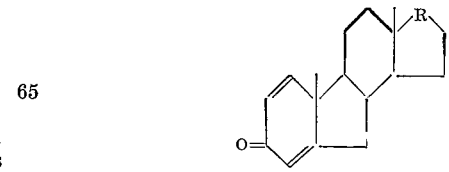

in which R is a member selected from the group consisting of

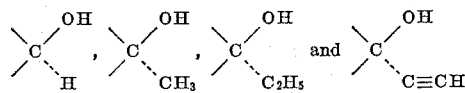

2. $\Delta^{1,2}$-B-nor-17α-methyltestosterone.

References Cited by the Examiner
UNITED STATES PATENTS
2,864,831   2/1958   Eppstein et al. _____ 195—51 X OTHER REFERENCES
Fieser et al.: "Steroids," p. 687 (1959).

References Cited by the Applicant
Physicians Drug Reference, Nineteenth Edition, 1965, page 582.

LEON ZITVER, *Primary Examiner.*
DANIEL D. HORWITZ, *Examiner.*
M. JACOB, *Assistant Examiner.*